Nov. 11, 1958  G. CORNELIUS  2,860,007
WHEEL SUPPORTED MOVABLE PIPE LINE
Filed Feb. 16, 1956  2 Sheets-Sheet 1
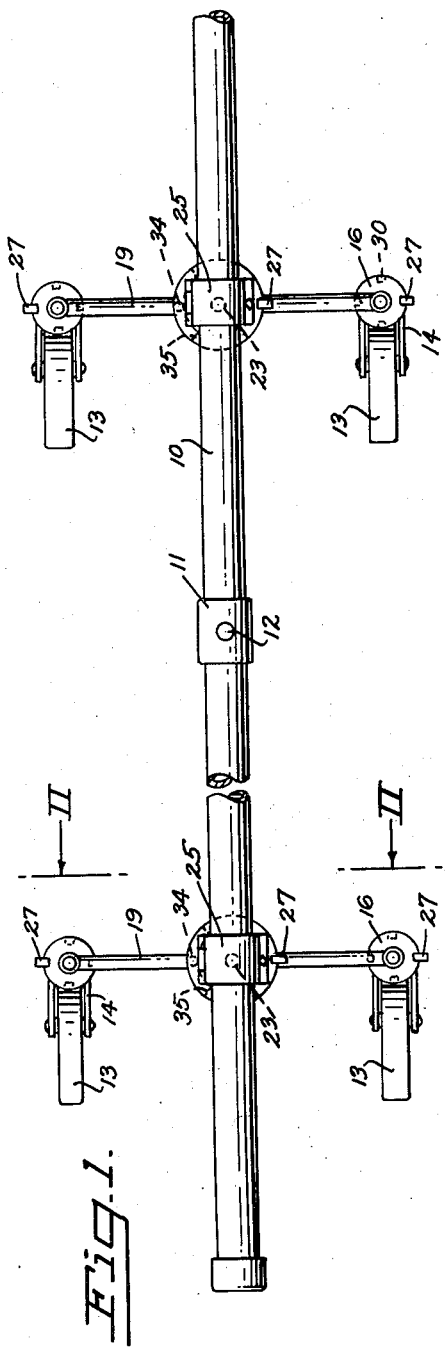
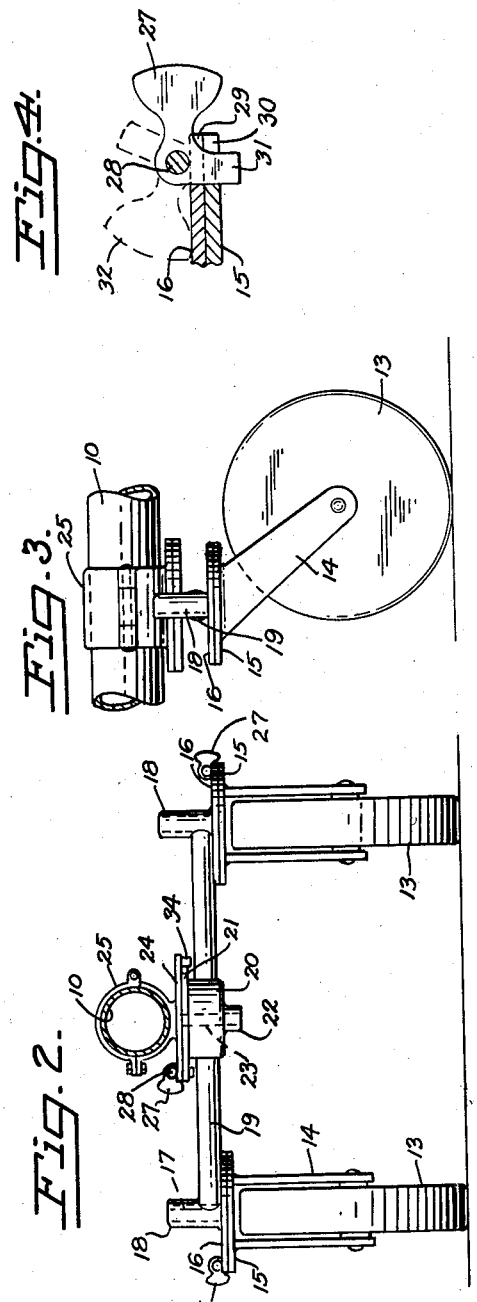
INVENTOR.
GAIL CORNELIUS
BY
*Fryer + Johnson*
ATTORNEYS

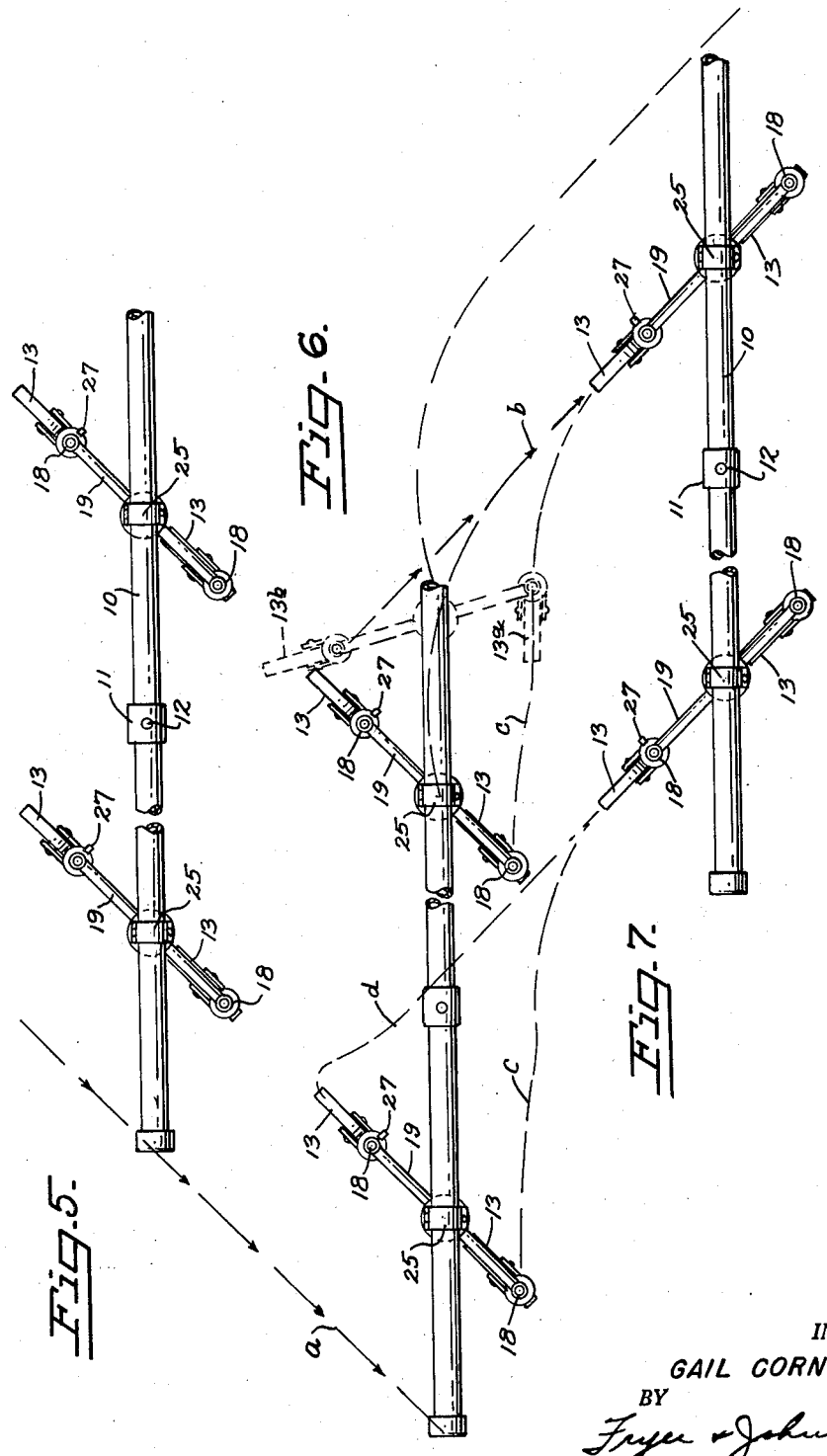

United States Patent Office 2,860,007
Patented Nov. 11, 1958

2,860,007

WHEEL SUPPORTED MOVABLE PIPE LINE

Gail Cornelius, Portland, Oreg., assignor to R. M. Wade & Co., Portland, Oreg., a corporation of Oregon Application February 16, 1956, Serial No. 565,899

3 Claims. (Cl. 299—47)

This invention relates to the moving of pipe lines such for example as those employed for sprinkler-type irrigation and particularly to supporting wheels for such a pipe line which enable it to be moved angularly or on a zig-zag path from one position to a second parallel position while the line itself remains in a substantially straight position.

The movement of the pipe line in the present application is similar to that disclosed in my United States Letters Patent for "Apparatus to Aid the Moving of Pipe Lines," Number 2,769,664 which issued on November 6, 1956. In said application, it is pointed out that the irrigation by the sprinkler system of a large field is often accomplished by use of a more or less permanent supply line extending along one edge of the field and having spaced valved outlets to which a sprinkler line disposed normal to the supply line may be connected one at a time. Thus as the sprinkler line is moved from one outlet to another and from one end of the field to the other, the entire field may be suitably irrigated. The present invention relates to the moving of a line from one outlet to another by providing sets of wheels as disclosed in my said co-pending application which enable the line to be pulled by a tractor or the like in a diagonal direction from its position at one valve outlet to a point midway between that outlet and the next outlet. The tractor is then attached to the opposite line and it is again pulled diagonally but at right angles to the first diagonal pull so that it is moved to a position adjacent the second outlet and with its end close to the supply line so that it may be connected to the second outlet.

To enable the type of movement described, the wheels must swivel with respect to the longitudinal center line of the pipe to assume diagonal positions with respect thereto and the present invention is particularly concerned with the wheels and wheel supporting structure through which the desired controlled swiveling movement is accomplished.

It is an object of the present invention to provide a structure of the character described in which it is unnecessary to apply brakes to the wheels for accomplishing the swivel required and in which one wheel of each set tracks the other in the set so that each set of wheels makes a single track across the field rather than a double track. This feature is desirable particularly where crops subject to damage by wheels are being irrigated.

Further and more specific objects of the invention are made apparent in the following specification wherein reference is made to the accompanying drawings.

In the drawings:

Fig. 1 is a plan view of a portion of a sprinkler pipe line having wheels constructed in accordance with the present invention and illustrated as fixed in the position for straight forward movement of the pipe line;

Fig. 2 is a sectional view on the line II—II of Fig. 1;

Fig. 3 is a view in side elevation of one set of wheels shown in Fig. 1;

Fig. 4 is an enlarged detailed view illustrating the construction of locking mechanism which is employed in connection with the swivel mounting of each wheel for holding it in any of several selected positions; and Figs. 5, 6 and 7 are schematic views in plan illustrating the positions assumed by the pipe supporting wheels during the movement of the pipe through its zig-zag path from one position to a second parallel position.

Referring first to Figs. 1 to 4 of the drawings a portion of a sprinkler pipe line is illustrated at 10 as having lengths of pipe connected as by couplings, one of which is illustrated at 11 provided with sprinkler outlets 12. Usually a stand pipe and sprinkler head (not shown) extend upwardly from each of the outlets 12.

As best illustrated in Figs. 1, 2 and 3, the pipe line is supported on spaced sets of wheels, each set comprising two wheels 13 journalled in forks 14 which are joined at their upper ends by a swivel plate 15 bearing against a similar swivel plate 16. The plate 15 has an upstanding trunnion shown in dotted lines at 17 fitting in a bearing 18 which projects upwardly from the center of the plate 16. A spreader bar 19 holds the wheels in spaced relationship and has a centrally disposed fitting 20 with an upwardly facing swivel plate 21 thereon. This plate is provided with a central bearing bore 22 for the reception of a downwardly extending trunnion shown in dotted lines at 23 carried on a matching swivel plate 24 and supporting a bracket 25 which embraces the pipe 10.

Each pair of swivel plates 15 and 16 for the wheels, as well as each pair of swivel plates 21 and 24 for the spreader bars 19, is capable of being locked against relative turning movement in any one of several positions preferably at 90° intervals. Since the locking means for all swivel connections are identical they may be described by reference to Fig. 4 wherein a pivoted latch 27 is illustrated as rotatable about a pin 28 welded to a top swivel plate 16 which spans a notch 29 formed in the edge of the plate. The cooperating lower swivel plate illustrated at 15 is provided with four similar notches arranged at 90° intervals and shown at 30. The latch 27 is enlarged or weighted at one end and has a locking finger 31 at its opposite end so that it may be swung from a released or dotted line position 32 to the full line position shown in Fig. 4 where the finger 31 extends through registering notches in the two swivel plates to hold them against relative rotation.

The swivel plates for the spread bars 19 are additionally limited in their movement to an arc of 90° by a pin 34 (see Figs. 1 and 2) projecting downwardly from the upper plate 24 and registering with an arcuate notch 35 in the lower plate 21.

The operation of the structure so far described is illustrated schematically in Figs. 5, 6 and 7 wherein Fig. 5 shows a portion of a pipe line ready to be moved from one position where sprinkling has been completed to a second position illustrated in Fig. 7 parallel to the first position and spaced therefrom a distance of say about sixty feet. The line is first pulled by a tractor moving in a direction of the arrows *a* to an intermediate position illustrated in Fig. 6 and is then moved in the direction of the arrows *b* to its final position shown in Fig. 7.

Starting from the position shown in Fig. 5, the wheels 13 on the side opposite to the direction that the pipe is to be moved are secured by the locks 27 in positions parallel to the spreaders 19. Thus when a tractor exerts a pull on the pipe in the direction of the arrows *a*, the unlatched wheels on the opposite end of each spreader assume a trailing position and since the pin 34 of Figs. 1 and 2 limits the swinging of the spreader to a position 45° from normal to the pipe line, the pipe may be moved any desired distance as for example to the position shown in Fig. 6 with the wheels remaining in their same relative positions and each pair of wheels moving in the same track.

The tractor is now connected to the opposite end of the pipe to exert a pull in the direction of the arrows $b$ and since the trailing wheels 13 are locked against swiveling movement, they pivot in the earth while the leading wheels 13 swivel to follow courses indicated by the broken lines $c$ moving through the position illustrated by the dotted line position 13$a$ and finally assuming the position shown in Fig. 7 during their course of travel to the final position of the pipe line where it is again connected to an outlet in the supply line. The course followed by the trailing wheels 13 is illustrated by the dotted line $d$ and an intermediate position of one of the trailing wheels is shown at 13$b$. The operation thus described moves the pipe line from the first position to the second position of a field to be irrigated and the entire operation is repeated as many times as is necessary to connect it to all of the supply line outlets and completely irrigate the field.

Should the irrigation of the same field be commenced from the opposite side, the latched wheels 13 would be unlatched and the unlatched wheels 13 would be latched so that the positions of the leading wheels and the trailing wheels would be reversed. In either event the wheels of each pair track during the movement of the pipe across the field reducing by 50% the damage that may be done to crops. The diameter of the wheels may be as desired so that the pipe line and spreaders 19 will clear the tops of growing plants in the crop. The latches 27 employed on the swivel plates 21 and 24 centrally of the spreaders 19 are engaged only when it is desired to move the pipe line in a straight forward direction as illustrated in Fig. 1 for transporting it along a road or from one field to another.

I claim:

1. A mobile sprinkler pipe line or the like having spaced supporting means therealong, a spreader arm adjustably pivotally connected to each of said supporting means, interengaging locking means and a limit stop means between said supporting means and said spreader arms and a caster wheel adjustably pivoted to an end portion of each of said spreader arms at substantially equal distances from said first mentioned adjustable pivotal connection, whereby either one or both of the wheels pivoted to each of said spreader bars may be locked in an adjusted position.

2. Apparatus as defined in claim 1 wherein said limit stop means includes a plate member connected to said spreader member and having a slot formed therein through an arc of approximately 90°; said limit stop means including a plate member connected to said pipe line and having a downwardly projecting pin secured thereto, said pin being disposed within said slot for movement into engagement with the opposite ends of the slot.

3. Apparatus as defined in claim 1 including means for locking the wheels in position substantially normal to the longitudinal axis of the spreader means and substantially in alignment with the longitudinal axis of said spreader means and comprising a swivel plate connected to said wheels and having formed therein a plurality of angularly spaced notches, and a latch member pivotally supported by said spreader members for movement of a portion thereof into one of the slots in an adjacent swivel plate.

References Cited in the file of this patent

UNITED STATES PATENTS

| 288,222 | Flad | Nov. 13, 1883 |
| 1,429,756 | Mitchell | Sept. 19, 1922 |
| 1,966,783 | Balaam | July 17, 1934 |
| 2,742,319 | Tobin | Apr. 7, 1956 |

FOREIGN PATENTS

| 356,073 | Germany | July 12, 1922 |